June 19, 1934.    H. C. KELLER    1,963,791
CONVEYER APPARATUS
Filed Nov. 4, 1930
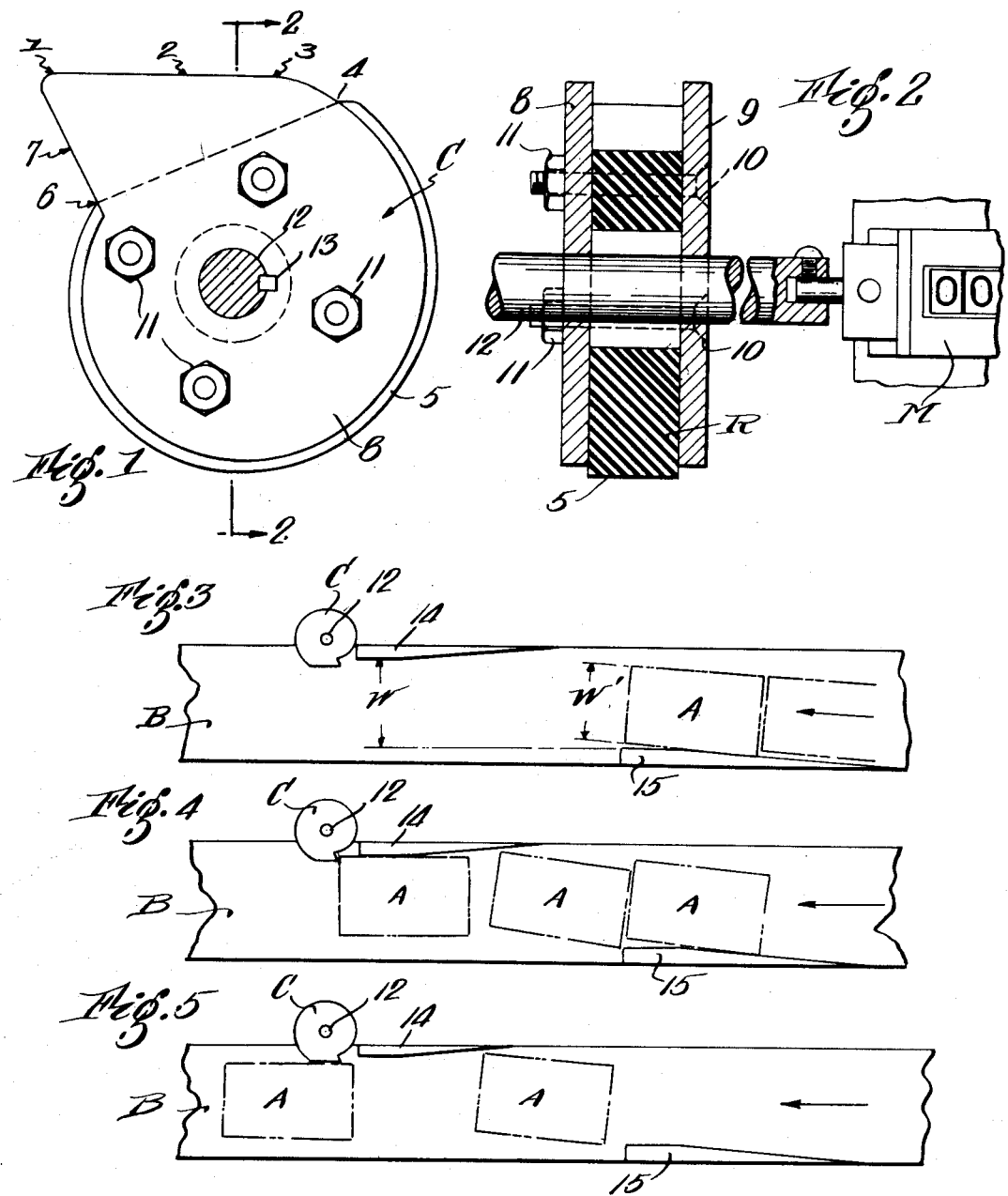

Patented June 19, 1934

1,963,791

UNITED STATES PATENT OFFICE 1,963,791

CONVEYER APPARATUS

Henry C. Keller, Syracuse, N. Y., assignor to The Lamson Company, Syracuse, N. Y., a corporation of Massachusetts Application November 4, 1930, Serial No. 493,291

9 Claims. (Cl. 198—40)

This invention pertains to conveyer apparatus, and more particularly to means for simultaneously spacing and counting articles moving in succession along a predetermined path.

The object of this invention is to provide a spacing device of simple character operable by each article of a series and which will space or arrange each article of the series in a fixed position laterally relative to the path of longitudinal movement, and which will also cause the number of such articles passing a given point to be accurately registered.

The invention is herein illustrated by way of example as embodied in a belt conveyer system, but in its broader aspects pertains to conveyer systems in general in which articles move successively along a predetermined path.

In the accompanying drawing:

Fig. 1 is a plan view of the wiper-like cam element hereinafter to be referred to as the cam;

Fig. 2 is an elevation of a section taken on line 2—2 of Fig. 1 and shows a means of registering the number of cycles completed by the cam to which it is connected; and Figs. 3, 4 and 5 are plan views of a conveyer system illustrating a preferred arrangement of the constituent instrumentalities and showing the relative positions of the articles carried by the conveyer at successive intervals of time.

Referring to the drawing, and particularly to Fig. 1, C represents a rotatable cam-like element having a peripheral contour generally similar to a wiper cam and mounted on the shaft 12 being locked thereto by key 13. Hereinafter the cam-like element C will be referred to as a cam.

The slope or pitch of the cam C is indicated by the numerals 1, 3, 5 and 6. The zone of maximum pitch is that portion of the peripheral surface intermediate 1 and 3 and preferably is of planar contour, as indicated by numeral 2. The peripheral surface 3—6 (clockwise) has a curvilinear contour varying radially relative to shaft 12 from the peripheral portion intermediate 3 and 4 to point 6 where the pitch is a minimum. The surface intermediate 6 and 1 preferably is of a planar contour, as indicated by numeral 7. The planar surfaces 2 and 7 meet and bound a projecting portion or nose.

The construction of cam C comprises two similar plate cams 8 and 9 mounted on and secured to the shaft 12 so that the corresponding portions of each plate coincide, as shown in Fig. 2. Intermediate plates 8 and 9 is a block of rubber R or other friction material surrounding shaft 12 and projecting beyond the plates 8 and 9 to define the peripheral surface 4—5—6 shown in Fig. 1. The peripheral surfaces 1—3—4 and 6—1 are defined by the rims of the plates 8 and 9. The rims comprising surface 1—3—4 are polished or otherwise made smooth to present a surface having relatively little friction. The plates 8 and 9 and intermediate rubber block R are held in assembled relation by means of screws 10 having heads countersunk in plate 9 and their ends engaging nuts 11. The shaft 12 is directly connected to a cyclometer, counter or other means M for registering the rotations of cam C.

Referring to Figs. 3, 4 and 5, the shaft 12 is mounted at right angles to the plane of the conveyer belt B and adjacent to the edge thereof so that a portion of the cam C is disposed in a spaced and overhanging relation to the belt. Stationary guides 14 and 15 are horizontally disposed on opposite sides of the path of travel in overhanging and spaced relation to the belt B, the guide 14 having an advanced position in the path of travel relative to the guide 15, and each having its bearing surface inwardly inclined (from left to right), relative to the center of the belt, as shown in Figs. 3, 4 and 5. The perpendicular distance W (Fig. 3) between the innermost portion of the bearing surface of the guide 15 and a line projecting from the innermost portion of the bearing surface of the guide 14 and parallel to the direction of travel of the belt B is preferably less than the width W' of the sides of the articles A. Hence any article so located on the belt B that it will not engage the guide 15 will surely engage the guide 14 and be directed thereby to the cam C. The end of the guide 14 adjacent the cam C is positioned so that its bearing surface is between the edge of the belt and a line parallel to the path of movement of the belt and tangent to the cam at a point on the peripheral surface of maximum pitch.

In consequence of this construction the articles A carried by the conveyer belt B, moving in the direction of the arrow, striking the guide 15 will be laterally displaced toward the guide 14 and the movement of the belt in the direction of the arrow (shown in Figs. 3, 4 and 5) will cause each article to engage the guide 14 which will alter its position so as to be directed toward the cam C. Continuing in their altered position, each of the articles will engage the cam C at or about the point 6 of minimum pitch, and due to the frictional engagement between the sides of the articles and the rubber peripheral surface of the cam, the latter will be rotated in a clockwise direction until the sides of the articles engage the relatively non-frictional peripheral surface 2. At this point the cam will have completed one revolution or cycle which is registered by the cyclometer or other registering mechanism, M, the position of the cam being shown in Fig. 5.

It will be observed that each of the articles will be shifted laterally toward the center of the belt B by the cam due to the increasing peripheral pitch and that each article will be laterally spaced or arranged in a horizontal position relative to the belt in consequence of its engagement with the surface 2 of the cam. The device thus comprises a spacing and counting mechanism.

A spacing and counting device as herein shown and described can be used in combination with practically all types of conveyers usually employed in handling packaged articles of manufacture, the only limitation being that the length of the rubber-surfaced periphery of the cam must be less than the length of the side of the article with which it is to engage.

While I have described a preferred embodiment of the invention, it is to be understood that in its broad aspects the invention is not confined to the specific details herein disclosed, but that various changes and modifications both in proportion of parts and in arrangements thereof may be made without departing from the spirit and scope of the invention as set forth in the following claims.

I claim:

1. The combination with a conveyer of means for arranging articles transported thereby in a predetermined position relative to the conveyer which means includes at least one stationary guide mounted on one side of the path of longitudinal movement and a rotatable cam mounted on the same side of the path of longitudinal movement as the guide and in a fixed relation thereto said cam being rotated by each article and acting to shift the articles laterally on the conveyer.

2. The combination with a conveyer of means for arranging articles transported thereby in a predetermined position relative to the conveyer which includes at least one guide disposed on one side of the path of travel in overhanging and spaced relation to the conveyer, and a rotatable cam disposed on the same side of the path of travel, as said guide and in a fixed relation thereto, said guide having an inwardly inclined bearing surface relative to the center of the conveyer adapted to direct articles being transported by the conveyer into engagement with said cam and said cam being rotated by each article and acting to shift the article laterally on the conveyer.

3. The combination with a conveyer of means for arranging articles transported thereby in a predetermined relation to the conveyer which includes two stationary guides mounted on opposite sides of the path of travel in overhanging and spaced relation to the conveyer, one of the guides having an advanced position in the path of travel relative to the other, and a rotatable cam disposed on the same side of the path of travel as the guide having the advanced position and in a fixed relation thereto, said guides having inwardly inclined bearing surfaces relative to the center of the conveyer, and adapted to cooperate with each other to direct articles being transported by the conveyer into engagement with said cam and said cam being rotated by each article and acting to shift the article laterally on the conveyer.

4. A device for counting articles transported by a conveyer which device includes a member given a complete rotation by each article and means for registering each such rotation of the member, said member including a portion bounded by planar surfaces which projects into the path of travel of the articles and engages each article at the beginning and end of each rotation.

5. A device for counting articles transported by a conveyer which device includes a member given a complete rotation by each article and means for registering each such rotation of the member, said member including a portion bounded by planar surfaces which projects into the path of travel of the articles and engages each article at the beginning and end of each rotation in combination with a guide by which each article is brought into a predetermined relation with said projecting portion at the beginning of such rotation.

6. A device for counting articles transported by a conveyer which device includes a cam like member and a nose carried thereby, the nose normally projecting into the path of travel of the articles and being directly engaged by each article and the peripheral surface of the member being frictionally engaged by each article to give the member a complete rotation thus restoring the nose to its normal position and means for registering each such rotation of the member.

7. A device for counting articles transported by a conveyer which device includes a cam like member having a zone of maximum pitch of planar contour a peripheral surface of curvilinear contour, and a surface of planar contour the last named surface projecting into the path of travel of the articles and being directly engaged thereby and the peripheral surface being of a length less than that of the side of the articles carried by the conveyer and being faced with a friction material whereby the member is completely rotated by the contact of the members with such surface to bring said zone into contact with the articles and means for registering each such rotation of the member.

8. The combination with a conveyer of means for counting and positioning articles transported thereby which means include a cam having a peripheral surface of curvilinear contour and varying pitch, and a nose bounded by planar surfaces connecting the ends of such surface, each article which contacts the surfaces of the cam rotating it and means for registering the rotations of the cam.

9. The combination with a conveyer of means for counting and positioning articles transported thereby which means include a cam having a peripheral surface of curvilinear contour and varying pitch, and a nose bounded by planar surfaces connecting the ends of such surface, each article which contacts the surfaces of the cam rotating it, means for guiding each article into contact with the cam and means for registering the rotations of the cam.

HENRY C. KELLER.